United States Patent [19]

Tooley

[11] Patent Number: 4,575,265

[45] Date of Patent: Mar. 11, 1986

[54] SEAL FOR SHAFT BEARINGS

[75] Inventor: Robert W. Tooley, Osceola, Ind.

[73] Assignee: Reliance Electric Company, Mishawaka, Ind.

[21] Appl. No.: 153,767

[22] Filed: May 27, 1980

[51] Int. Cl.[4] ............................................. F16C 33/76
[52] U.S. Cl. ..................................... 384/474; 277/82; 384/484
[58] Field of Search .......................... 277/95, 82, 152; 308/36.1, 36.2, 187, 187.1, 187.2, 207 R; 384/463–489

[56] References Cited

U.S. PATENT DOCUMENTS

| 3,494,681 | 2/1970 | Anderson et al. | 277/82 X |
| 3,858,950 | 1/1975 | Otto | 384/485 |
| 3,994,545 | 11/1976 | Van Dorn | 308/187.1 |
| 4,054,335 | 10/1977 | Timmer | 308/187.1 X |
| 4,106,781 | 8/1978 | Benjamin et al. | 277/82 |

FOREIGN PATENT DOCUMENTS 153472 9/1953 Australia ............................ 384/474

*Primary Examiner*—Stephen Marcus
*Attorney, Agent, or Firm*—Marmaduke A. Hobbs

[57] ABSTRACT

A seal for a bearing having a housing with an opening therein for receiving a shaft in which a bearing assembly is mounted in the housing and has an inner race for receiving the shaft. A seal consisting of a ring having a radially extending, outwardly facing flat surface is disposed in the housing opening adjacent the inner race, and a seal which may be of the V-ring type is mounted on the inner race and has a lip which seats on and rubs against the radial surface of the ring. Collars may be used on the race to retain the lipped seal in proper relationship with the ring on the inner race. The relationship of the lip to the metal ring is such that the bearing assembly can be purged by the outward flowing of the lubricant yet protected from the ingress of foreign matter. In some modifications, an auxiliary seal, which is disposed externally with respect to the lipped seal, may be used.

6 Claims, 7 Drawing Figures

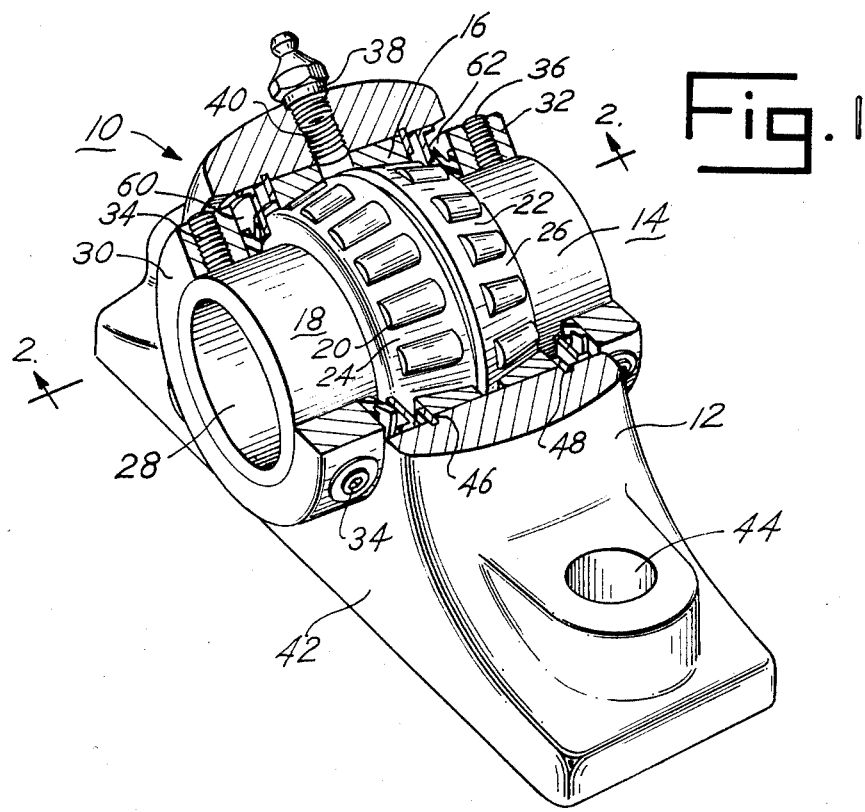
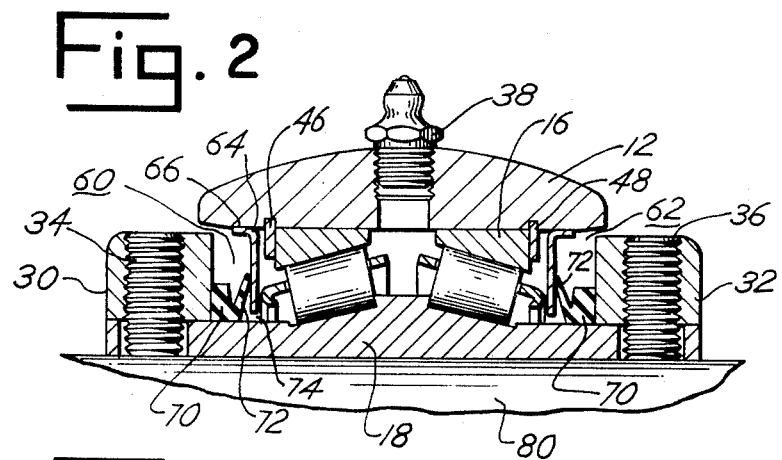
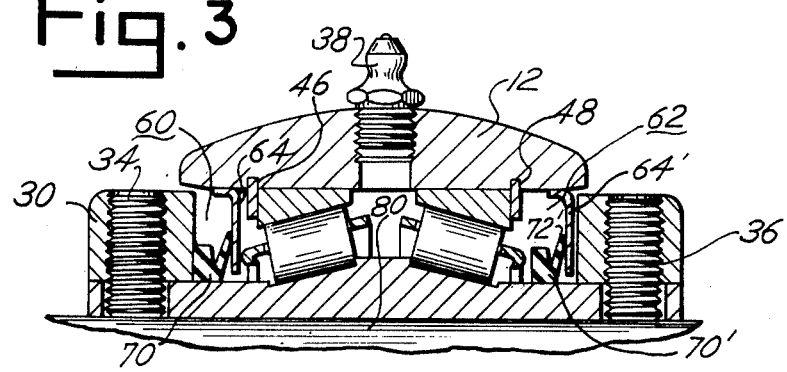

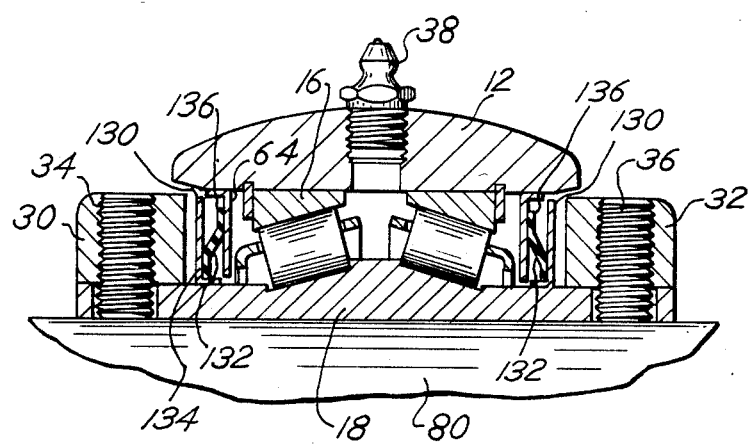
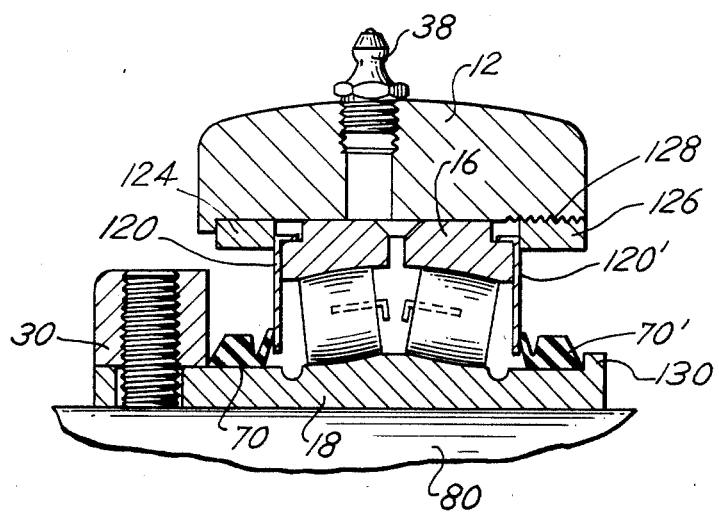

SEAL FOR SHAFT BEARINGS

In conventional pillow blocks and similar large size shaft bearings, it is a common practice to seal the bearings between the shaft and housing with a labyrinth type seal which, when properly lubricated, performs rather effectively to exclude foreign matter, including dirt and moisture, and which permits a purging action to take place to expel dirt and moisture from the bearing cavity while the bearing is in operation and/or while the bearing is being lubricated. A labyrinth seal normally consists of two or three interrelated annular grooves and ribs on the shaft and in the opening in the housing. One common type of labyrinth seal is, in effect, an open seal which, on smaller bearings, will fill with lubricant and provide effective purging during operation and lubrication of the bearing, while minimizing the ingress of moisture and foreign particulate matter. However, on larger bearings, this type of labyrinth seal often fails to perform satisfactorily, in that the lubricant injected in the housing usually settles into a sump or recess in the bottom and fails to fill the annular grooves in the seal, thus permitting the free flow of moisture and abrasive particulate matter through the seal into the bearing housing. Further, since the lubricant from the housing fails to fill the grooves of the seal, effective purging operations to remove dirt from the seal are not possible. In an effort to prevent the ingress of moisture and foreign matter into the bearing housing in the large bearings, an auxiliary seal is sometimes used externally of the labyrinth seal. The auxiliary seal is usually a V-ring type which is mounted firmly on and rotates with the shaft, and which has a lip seating on an annular radial surface on the housing adjacent the labyrinth seal. This type of seal, however, is not fully effective in that, as the shaft moves endwise during operation, the lip may become fully displaced from the radial sealing surface, thereby providing a space through which moisture and dirt can reach and pass through the labyrinth seal. Further, the labyrinth seal, either alone or in combination with the auxiliary seal, will not function effectively or give optimum performance when the bearing is used to journal a shaft in vertical position, thus limiting the range of uses of bearings with this type of seal structure.

Another type of labyrinth seal involves the use of a flexible plastic ring in the grooves or spaces between the ribs on the shaft and housing opening, the ring seating on the ribs and assisting in closing the seal to exclude the free flow of foreign matter through the seal; however, this modified type of labyrinth seal does not positively preclude the ingress of dirt and moisture into the bearing, particularly in response to a pumping action created during the operation of the bearing by the collar or other parts normally used on one or both ends of the bearing. Thus the advantages of the self purging action of the bearing with this type of labyrinth seal may be fully negated by the ingress of foreign matter resulting from the pumping action of the collars.

It is therefore one of the principal objects of the present invention to provide a shaft bearing seal which permits an effective purging action of the bearing during operation and lubrication, yet which positively seals the bearing from the ingress of foreign matter, both during operation and during cooling of the bearing afterwards when it becomes inoperative.

Another object of the present invention is to provide a seal between the inner race of a roller or ball bearing and the end walls of the bearing housing, which utilizes a V-ring type seal in combination with one or more metal rings mounted in the shaft opening of the housing, and which permits the flow of lubricant, dirt and moisture outwardly through the seal and prevents the ingress of dirt and moisture into the bearing.

A further object of the invention is to provide a bearing seal of the aforementioned type, which is relatively simple in construction and operation, and which has little or no wear between the moving parts and hence provides a long, trouble-free life, with little or no servicing or other attention to maintain it in optimum operating condition.

Still another object of the invention is to provide a seal for shaft bearings which is particularly adapted for large bearings, and which functions effectively irrespective of the position of the bearing and shaft.

Additional objects and advantages of the present invention will become apparent from the following description and accompanying drawings, wherein:

FIG. 1 is a perspective view of a pillow block and shaft with a portion of the housing of the pillow block being broken away to show more effectively the seals therein;

FIG. 2 is an enlarged fragmentary cross sectional view of the pillow block shown in FIG. 1, the section being taken on line 2—2 of FIG. 1;

FIG. 3 is a vertical cross sectional view of a pillow block showing a different arrangement of the bearing seal used therein;

FIG. 6 is a vertical cross sectional view of a pillow block illustrating a different form of the present invention relative to the seals therein; and FIG. 7 is a vertical cross sectional view of a pillow block illustrating still another modified form of the present invention relative to the seals used therein.

Figure 4:
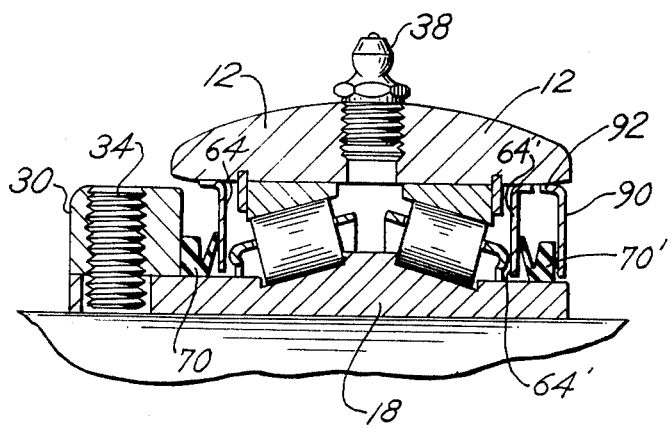
FIG. 4 is a vertical cross sectional view of a pillow block similar to those shown in the preceding figures, illustrating a modified form of the seals.

Referring more specifically to the drawings and to FIG. 1 in particular, numeral 10 indicates generally a pillow block having a housing 12 and a bearing assembly 14 mounted in the cavity of the pillow block and supported by the housing. The bearing assembly may, for the purpose of the present invention, be considered as conventional and consists generally of an outer race 16, an inner race 18 and two rows of roller bearings 20 and 22, with the roller bearings being held in place between the outer and inner races by cages 24 and 26, respectively. When the bearing is installed, a shaft extends through opening 28 of inner race 18 and normally extends completely through the inner race and projects outwardly from the ends thereof. The inner race is retained firmly in place on the shaft by a pair of collars 30 and 32 and a plurality of set screws 34 and 36 in the respective collars 30 and 32 extending through holes in the inner race and seating on the shaft. The bearing assembly is lubricated through a fixture 38 mounted in a threaded bore 40 in the upper portion of housing 12. The housing is provided with a base 42 containing a hole 44 on each side of the base for securing the pillow block on a supporting structure. The bearing assembly is held in operating position in the pillow block by snap rings 46 and 48 disposed in grooves in the housing on opposite sides of outer race 16. While the present invention is designed primarily for large bearings, such as the pillow block described herein, the invention is applicable to various other types and sizes of bearings.

The seals which embody the present invention are disposed on opposite sides of the bearing assembly and are identified by numerals 60 and 62. In several of the embodiments, the seals on opposite sides of the bearing assembly are essentially identical, with the possible exception of reversal of position, and hence only one will be described in detail, and like numerals with primes will be applied to corresponding parts of the other seal. Seal 60 consists of a metal ring 64 extending inwardly from the inner edge of the bore of the housing and having a flange 66 which seats snugly on the housing bore and holds the ring firmly in place in the housing. The ring is essentially a flat plate-like member with a smooth uninterrupted surface facing outwardly. A V-ring seal or gasket 70 is seated on one end of inner race 18 and has a lip 72 extending laterally inwardly and seating on the external surface of ring 64 throughout its full circumference. The V-ring seal seats firmly on the inner race and, when the lip is in proper contact with the outer surface of ring 64, an effective lubricant seal is created and maintained between the inner race and the bore of the housing. Ring 64 is spaced from the inner race, thereby providing an annular opening 74 through which lubricant may flow when the pillow block is lubricated, and further permitting the internal pressure in the bearing created by heat to be relieved by the passage of air and lubricant through opening 74 and past lip 72. The V-ring is retained in proper position relative to ring 64 by collar 30 secured to a shaft by the plurality of set screws 34 extending through the collar and inner race and seating on the shaft, illustrated in FIG. 2 at numeral 80. Ring 64 is attached to the housing and hence remains stationary, while the V-ring fits snugly on the periphery of the inner race and rotates therewith. The manner in which the lip of the V-ring seats on ring 64 permits the egress of lubricant, air and vapor from the bearing, and prevents dirt, moisture and other foreign matter from entering the bearing. In operation, the seal readily permits purging of the bearing by permitting the lubricant to pass between lip 72 and ring 64, and the foreign matter is prevented from passing into the bearing assembly by the seating of the lip on and in sliding contact with the ring. While the lip normally seats lightly on the ring, it effectively prevents in-flowing of foreign matter into the bearing from any cause, including the effect of the pumping action of the collars.

The modified form of the bearing seals shown in FIG. 3 is similar in most respects to the form shown in FIG. 2, except that one of the seals is placed in a position which permits the bearing and shaft to be placed in vertical position without any substantial loss of lubricant during the operation of the bearing. In this embodiment, seal 62, which will be located on the lower side of the bearing when installed, has been modified by reversing the relative positions of V-ring 70' and ring 64' so that lip 72' of V-ring 70' engages the inner surface of ring 64', the ring 64' being positioned outwardly from the V-ring. In this embodiment, the V-ring 70 in seal 60 functions in the same manner as that described in connection with the embodiment shown in FIG. 2; however, the lip 72' of V-ring 70' prevents the lubricant from flowing outwardly, and sufficient pressure is normally exerted by the lubricant on the lip to seat it sufficiently firmly on ring 64' that the ingress of foreign matter into the bearing through seal 62 is reduced to a minimum.

The embodiment of the invention illustrated in FIG. 4 is similar in most respects to the embodiment illustrated in FIG. 2, the primary difference being in the use of the ring 90 on one side of the bearing assembly in place of collar 32. The ring 90 has a flange 92 which seats snugly in the bore of housing 12 and is held therein by a snug fit. The V-ring 70' is seated on inner race 18 between rings 64' and 90 with the lip of the V-ring seating on the outwardly facing surface of ring 64'. The V-ring is held in place by the two rings 64' and 90, and the two rings, along with the V-ring seal, form an effective labyrinth type seal with the lip performing a valvular function of permitting the bearing to be purged by the egress of lubricant from the bearing, but preventing the ingress of dirt, moisture and other foreign matter through the seal into the bearing by the seating of the lip on the annular surface of ring 64'. Bearing 60 in this illustration is the same as that illustrated in FIGS. 2 and 3.

Figure 5:
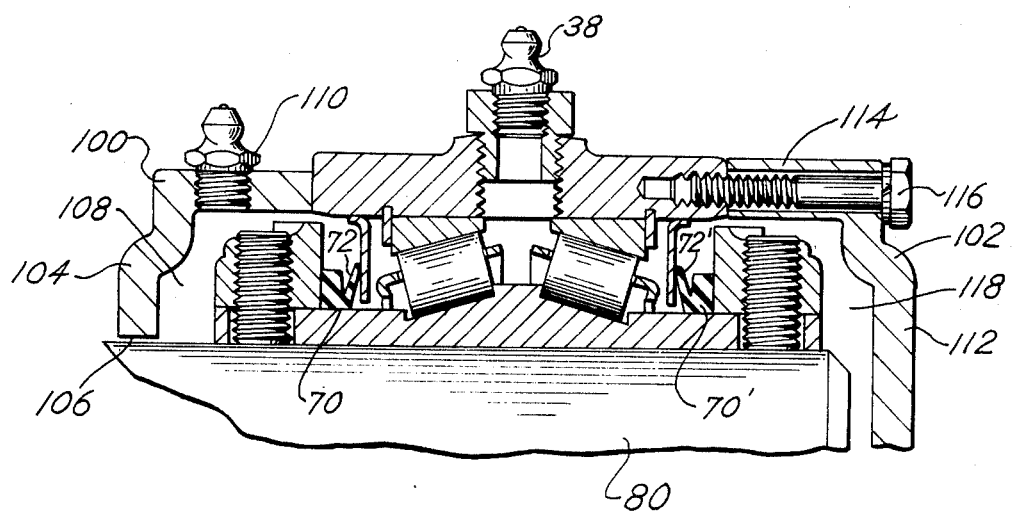
FIG. 5 is a vertical cross sectional view of a pillow block showing another modified form of the seals.

FIG. 5 illustrates a further modified form of the present invention in which the bearing seals, such as those shown in FIG. 2, are incorporated in a sealing system in which an auxiliary seal is used; hence, like numerals will be used to identify like parts. In this embodiment, the auxiliary seals are indicated by numerals 100 and 102, seal 100 consisting of an annular member secured to the outer edge of the housing around the bore therein, and having a flange 104 extending inwardly to a point near the shaft but spaced therefrom to provide an opening 106. The seal 100 encloses collar 30 and forms a cavity 108 therein which communicates with seal 60. The cavity 108 is lubricated by a fixture 110, and lubricant injected into the cavity through the fixture is forced outwardly through opening 106 and is prevented from entering the bearing assembly by the lip of V-ring 70. Thus the lubricant can purge the auxiliary seal 100 by flowing only outwardly through opening 106. In the embodiment illustrated, auxiliary seal 102 consists of a plate 112 having an annular flange 114 secured to the housing by a plurality of screws 116. This type of auxiliary seal can be used only where the shaft terminates near or at the adjacent end of the bearing assembly.

The embodiment of the seals shown in FIG. 6 is similar in most respects to that disclosed in FIGS. 1 and 2; however, in this embodiment rings 120 and 120', corresponding to rings 64 and 64', are retained in place by the seating of ring 120 against an annular insert 124 by the force applied by threaded ring 126 inserted in threaded opening 128 at the end of the bore of the housing. When ring 126 is seated against ring 120', outer race 16 applies pressure against ring 120, and consequently the two rings and inner race are held firmly in place, and the rings are maintained in proper position relative to the bearing assembly. V-rings 70 and 70' are disposed outwardly from rings 120 and 120', and V-ring 70 is retained in place by collar 18 and V-ring 70' is retained in place by a shoulder 130. The seals operate in the same manner as seals 60 and 62 of the embodiment shown in FIG. 2, thus permitting the bearing assembly to be purged when the lubricant is injected into the assembly and during the operation of the bearing, while preventing the ingress of foreign matter by the seating of lips 72 and 72' on their respective rings 120 and 120'.

In the embodiment of the invention of FIG. 7, a somewhat different type of sealing structure is illustrated. In this embodiment the V-ring has been replaced by a ring 130 and an annular member 132 of rubber or rubber-like material is cemented or otherwise secured to ring 130 near the inner edge thereof at numeral 134. The outer edge 136 of annular member 132 merely seats against the surface of ring 64 and slides thereon as the inner race rotates relative to the ring. This type of seal permits the purging of the bearing when the bearing is in operation and during lubrication thereof, but prevents the ingress of foreign matter in the same manner as lip 72 of the V-ring. The other features of the bearing are essentially the same as those described with reference to FIGS. 1 and 2.

It is seen from the foregoing that a relatively simple sealing structure is provided between the inner race of the bearing assembly and the housing of a pillow block or other type of bearing. In all of the embodiments of the present seal, at least one of the two seals permits purging of the bearing assembly but prevents ingress of foreign matter during the operation of the bearing or during the time when the bearing is cooling from operating temperature to room temperature. The light pressure required to obtain the effective sealing action by lip 72 or 136 is such that very little or no wear occurs between the lip and the corresponding ring on which the lip seats, thus prolonging the life of the seal and requiring less service, while at the same time permitting effective purging of the bearing assembly and protection thereof from dirt, moisture and other foreign matter. Assembly of the bearing, including the seals, can be performed in the manufacturing plant, and the bearing does not require disassembling in the field when the shaft is to be installed in the bearing, thus permitting prelubrication of the bearing and preventing the ingress of foreign matter prior to use as well as during use of the bearing.

While a number of embodiments of the present invention have been described herein, various other embodiments and modifications may be made without departing from the scope of the invention.

I claim:

1. A seal for a bearing having a housing with an opening therein for receiving a shaft, and a bearing assembly disposed in said housing and having an outer race and an inner race extending axially relative to the housing opening, a plurality of rotatable bearing elements between said races, and an integral annular extension on the inner race projecting outwardly beyond the end of said outer race, said seal comprising a ring member connected to said housing in said opening and having a smooth annular surface extending radially inwardly toward said inner race, an annular sealing means of the V-ring type mounted directly on and in sealing relationship with said integral annular extension of the inner race externally of said surface and having an annular lip extending generally radially outwardly and seating on said annular surface of said ring member for permitting egress of lubricant from the bearing assembly to purge the assembly and preventing ingress of forgein matter into the bearing assembly, and a collar disposed on said inner race outwardly from said annular sealing means and forming an abutment engaged by said V-ring type sealing means for retaining said sealing means in substantially fixed axial operating relationship with said ring member.

2. A seal for a bearing as defined in claim 1 in which said annular sealing means is seated firmly on and rotatable with said inner race, and means is provided for securing said inner race to a shaft for rotation therewith.

3. A seal for a bearing as defined in claim 2 in which said means for securing the inner race to the shaft includes said collar disposed on said inner race outwardly from said annular sealing means, and at least one set screw extending through said collar and said extension of the inner race to the shaft.

4. In a bearing having a housing with a cavity therein, and shaft openings on opposite sides of the housing: a bearing and seal assembly disposed in said housing and having an outer race and an inner race extending axially relative to said housing openings, a plurality of rotatable bearing elements between said races, and an integral annular extension on said inner race projecting outwardly beyond the end of said outer race, a ring member connected to said housing in one of said openings and having a smooth annular surface extending radially inwardly toward said inner race, annular sealing means of the V-ring type mounted directly on and in sealing relationship with said integral annular extension of the inner race externally of said surface and having an annular lip extending generally radially outwardly and seating on said annular surface of said ring member for permitting egress of lubricant from the bearing assembly to purge the assembly and preventing ingress of foregin matter into the bearing assembly, a means for securing said inner race to the shaft for rotation therewith, and a collar disposed on said inner race outwardly from said annular sealing means and forming an abutment engaged by said V-ring type sealing means for retaining said sealing means in substantially fixed axial operating relationship with said ring member.

5. A seal for a bearing as defined in claim 4 in which said annular sealing means of the V-ring type is seated snugly on and is rotatable with said inner race.

6. A seal for a bearing as defined in claim 5 in which said means for securing the inner race to said shaft includes said collar disposed on said inner race outwardly from said annular sealing means, and at least one set screw extending through said collar and inner race.

* * * * *